(12) United States Patent
Wan et al.

(10) Patent No.: US 11,580,135 B2
(45) Date of Patent: Feb. 14, 2023

(54) ANOMALY DETECTION FOR CLOUD APPLICATIONS

(71) Applicant: SAP SE, Walldorf (DE)

(72) Inventors: Deng Feng Wan, Shanghai (CN); Yangchun Deng, Shanghai (CN); Hui Zhang, Shanghai (CN); Zuxing Wang, Shanghai (CN)

(73) Assignee: SAP SE, Walldorf (DE)

( * ) Notice: Subject to any disclaimer, the term of this patent is extended or adjusted under 35 U.S.C. 154(b) by 128 days.

(21) Appl. No.: 17/089,335

(22) Filed: Nov. 4, 2020

(65) Prior Publication Data

US 2022/0138227 A1 May 5, 2022

(51) Int. Cl.
| G06F 15/173 | (2006.01) |
| G06F 16/28 | (2019.01) |
| G06F 11/30 | (2006.01) |
| H04L 43/08 | (2022.01) |
| H04L 67/10 | (2022.01) |
| H04L 67/02 | (2022.01) |
| G06F 11/34 | (2006.01) |
| H04L 41/142 | (2022.01) |
| H04L 9/40 | (2022.01) |

(52) U.S. Cl.
CPC ........ *G06F 16/285* (2019.01); *G06F 11/3006* (2013.01); *G06F 11/3495* (2013.01); *H04L 41/142* (2013.01); *H04L 43/08* (2013.01); *H04L 63/1408* (2013.01); *H04L 63/1425* (2013.01); *H04L 67/02* (2013.01); *H04L 67/10* (2013.01)

(58) Field of Classification Search
None
See application file for complete search history.

(56) References Cited

U.S. PATENT DOCUMENTS

| 10,789,293 | B2* | 9/2020 | Kushkuley | G06F 16/3338 |
| 11,314,444 | B1* | 4/2022 | Brooker | G06F 3/0655 |
| 11,314,576 | B2* | 4/2022 | Baldassarre | G06F 11/079 |
| 2013/0097706 | A1* | 4/2013 | Titonis | G06F 21/566 726/22 |
| 2017/0019308 | A1* | 1/2017 | Rapoport | G06F 11/3409 |
| 2018/0025303 | A1* | 1/2018 | Janz | G16H 50/20 705/2 |
| 2020/0233728 | A1* | 7/2020 | Manzano | G06F 9/5083 |
| 2021/0406642 | A1* | 12/2021 | Chorakhalikar | G06N 3/063 |
| 2022/0067525 | A1* | 3/2022 | Sequeira | G06N 3/082 |

* cited by examiner

*Primary Examiner* — Phuoc H Nguyen
(74) *Attorney, Agent, or Firm* — Klarquist Sparkman, LLP (57) ABSTRACT

Requests are received for handling by a cloud computing environment which are then executed by the cloud computing environment. While each request is executing, performance metrics associated with the request are monitored. A vector is subsequently generated that encapsulates information associated with the request including the text within the request and the corresponding monitored performance metrics. Each request is then assigned (after it has been executed) to either a normal request cluster or an abnormal request cluster based on which cluster has a nearest mean relative to the corresponding vector. In addition, data can be provided that characterizes requests assigned to the abnormal request cluster. Related apparatus, systems, techniques and articles are also described.

20 Claims, 6 Drawing Sheets

ANOMALY DETECTION FOR CLOUD APPLICATIONS

TECHNICAL FIELD

The subject matter described herein relates to the detection of anomalous requests received by a cloud computing environment.

BACKGROUND

Large scale cloud computing environments receive large numbers of requests originating from various clients. In typical scenarios, the requests are handled by the cloud computing environment and responses are sent to the clients. In some cases, the requests result in various errors including server-side errors which can result in the requests being re-sent to the cloud computing environment which can negatively affect system performance. Early identification of anomalous requests can allow engineering teams to take measures to avoid any future performance issues by the cloud computing environment.

SUMMARY

In a first aspect, requests are received for handling by a cloud computing environment which each encapsulate text. Thereafter, each of the requests is executed by the cloud computing environment. While each request is executing, performance metrics associated with the request are monitored. A vector is subsequently generated that encapsulates information associated with the request including the text within the request and the corresponding monitored performance metrics. Each request is then assigned (after it has been executed) to either a normal request cluster or an abnormal request cluster based on which cluster has a nearest mean relative to the corresponding vector. In addition, data can be provided that characterizes requests assigned to the abnormal request cluster.

The normal request cluster and the abnormal request cluster can be generated using k-means clustering. The nearest mean can correspond to a cluster having a least squared Euclidian distance. The normal request cluster and the abnormal request cluster can be generated based on logged historical requests received by the cloud computing environment. The requests can be of different types and, for each request type, there can be a corresponding normal request cluster and a corresponding abnormal request cluster.

The k-means clustering can define the normal request cluster and the abnormal request cluster using combined vectors encapsulating information derived from logged historical requests with numeric performance metrics associated with the corresponding request. Text from logged historical requests can be converted into numeric values using a word embedding algorithm such as word2vec.

Text within each logged historical request can be selectively removed prior to generating the corresponding combined vector to optimize the k-means clustering. Each combined vector can be normalized prior to generating the normal request cluster and the abnormal request cluster using k-means clustering. Multiple vectors can be averaged for each historical request to generate an average vector which, in turn, can be combined with a numeric vector to result in the combined vector for each request.

The logged historical requests can encapsulate various information such as a type of request, an amount of time to handle the request, an amount of time to handle a query associated with the request, processing resources used by the request, and/or memory used by the request.

The requests can originate from a client computing device and be associated with execution of a cloud-based software application in a browser executing on the client computing device.

The requests can be hypertext transfer protocol (HTTP) requests.

In addition to executing the requests assigned to the normal request cluster, the cloud computing environment can execute or attempt to execute those requests that are assigned to the abnormal request cluster.

The providing data can include one or more of: causing the data characterizing requests assigned to the abnormal request cluster to be displayed in an electronic visual display, storing the data characterizing requests assigned to the abnormal request cluster in physical persistence, loading the data characterizing requests assigned to the abnormal request cluster in memory, or transmitting the data characterizing the requests assigned to the abnormal request cluster to a remote computing system.

At least one code patch can be implemented in the cloud computing environment which causes a request previously assigned to the abnormal request cluster to be subsequently assigned to the normal request cluster when received again by the cloud computing environment.

In a further interrelated aspect, a cloud computing environment receives a plurality of requests for handling by the cloud computing environment. Each of the requests is then executed by the cloud computing environment. During such execution, performance metrics associated with the execution of each request can be logged in a log. At a later point, a vector is generated for each request in the log that encapsulates information associated with the request including the text within the request and the corresponding monitored performance metrics. A clustering technique such as k-means clustering is then applied to generated vectors to, in turn, generate a normal request cluster specifying a boundary for the vectors and an abnormal request cluster that corresponds to vectors falling outside the specified boundary of the normal request cluster. After the clusters are generated, new requests can be received for handling by the cloud computing environment. Thereafter, each of the new requests is executed by the cloud computing environment. While each new request is executing, performance metrics associated with the new request are monitored. A vector is subsequently generated for each new request that encapsulates information associated with the new request including the text within the new request and the corresponding monitored performance metrics. Each new request is then assigned (after it has been executed) to either the normal request cluster or the abnormal request cluster based on which cluster has a nearest mean relative to the corresponding vector. In addition, data can be provided that characterizes requests assigned to the abnormal request cluster.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter for more precisely identifying anomalous requests received by a cloud computing environment so they can be handled appropriately.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to enhanced techniques for identifying anomalous requests (e.g., HTTP requests, etc.) generated by computing devices and received by a cloud computing environment. The cloud computing environment includes a plurality of servers which handle incoming requests. As described in further detail below, the cloud computing environment either prior to or subsequent to handling the incoming requests can classify each request as being normal (i.e., typical or frequent, etc.) or abnormal (i.e., anomalous, etc.). Abnormal in this context refers to requests that may take very long time to handle (e.g., an amount of time over a pre-defined threshold, etc.) due to system exceptions or failures. In addition, the cloud computing environment can return exceptional results to the devices originating the requests.

As will be described in more detail below, different information extracted or otherwise derived from cloud requests is logged by a cloud computing environment. The information for each request which can take the form of numeric values and text is converted into a vector having a uniform size and scale. A word embedding model such as Word2vec can be used to convert any text within the requests to numeric vectors. These two types of vectors can then be combined. Once these combined vectors are generated, an unsupervised learning algorithm such as a clustering algorithm (e.g., k-means clustering, etc.) can be used to separate requests into two or more categories (e.g., normal request/abnormal request, etc.). Once the model is trained, requests can be classified when received and handled based on their respective category. Moreover, even before a model is fully trained, anomalous requests can also be identified. The model can be configured to operate on different types of requests such that each type can have different criteria for classification for normal/abnormal.

As an example, a request received by the cloud computing environment to browse a products list on a e-commercial website is first analyzed by removing unnecessary text (e.g., stop words such as "the", "is", "that", etc.). Any remaining text is next converted to a vector. In addition, numeric values for the request corresponding to factors such as request time, SQL time, CPU time, consumed memory are obtained and used to generate the other vector. A particular customer using these requests to generate responses from the cloud computing environment may find that the combined vector is further away from that customer's desired center of normalcy. As an example, certain values in the vector generated from the text of the request may skew the combined vector even though the corresponding numeric vector may have contained more closely acceptable values.

Figure 1:
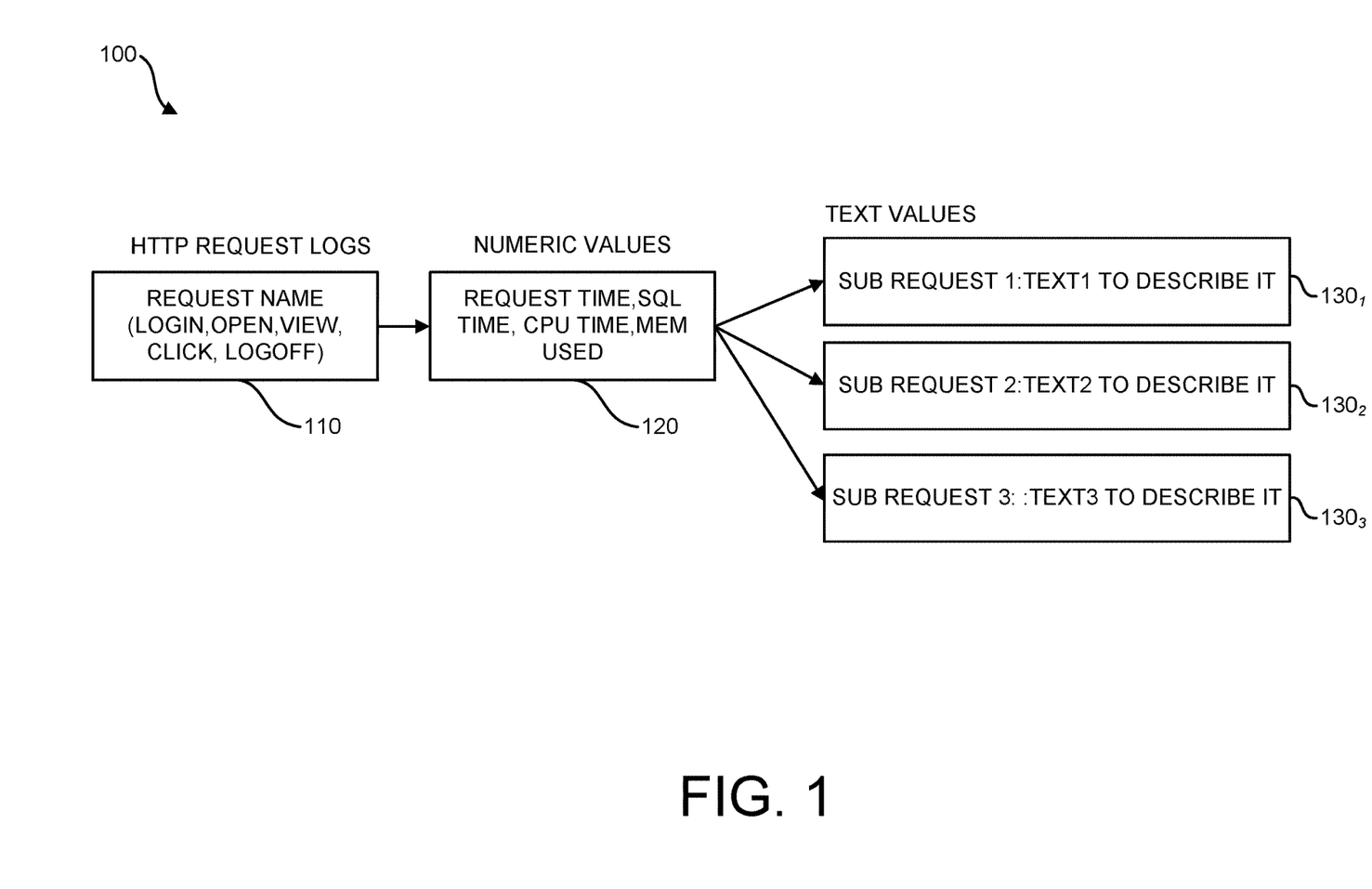
FIG. 1 is a diagram illustrating aspects of a logged historical request received by a cloud computing environment.

FIG. 1 is a diagram 100 illustrating the information used to characterize a logged request received by a cloud computing environment from a client computing device. These requests can, for example, be an HTTP request used in connection with the execution of an application by the cloud computing environment (with a corresponding graphical user interface/browser being displayed on a client computing device). Such monitoring can be performed by an intermediate component such as a load balancer which directs requests received by the cloud computing environment for processing by various backend servers. The log can include identifying information 110 such as request name and the type of request such as login to the system, open a specific page, view a page, click on a hyperlink, logoff and the like. A second portion of the log can refer to numeric values 120 that characterize various performance metrics that are determined by monitoring the corresponding request such as request time (amount of time to handle the request), SQL time (amount of time to handle any related queries from database SQL execution), CPU time (length of time that a processor was used), consumed memory and the like. Further, the request can be decomposed into numerous sub requests $130_{1...3}$ when the server or servers are not able to handle the request in a single step which can be helpful in subsequently identifying anomalous requests. For example, a user logon request may involve submitted username and password, authentication, loading from cache of head page or query from database necessary configuration. For each sub request, there can be corresponding log records to describe what each sub request is doing and the associated key parameters.

Figure 2:
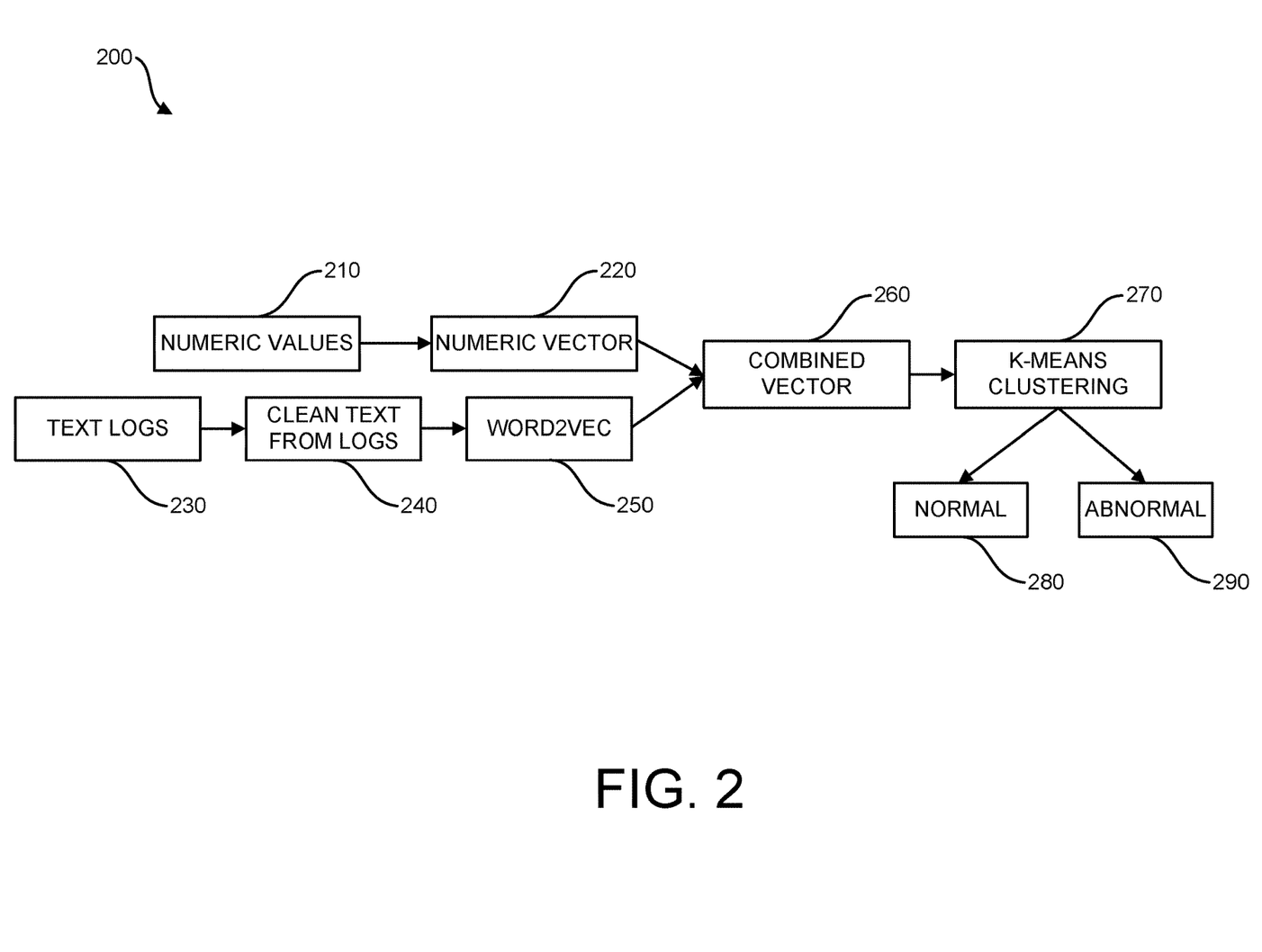
FIG. 2 is a first diagram illustrating aspects relating to the generation of a normal request cluster and an abnormal request cluster from logs input data.

FIG. 2 is a diagram 200 illustrating other aspects of detecting anomalous requests by a cloud environment. From a logged request, initially, the numeric values 210 associated with the execution of the request are extracted and then vectorized to result in a numeric vector 220. The textual portion of the logs (i.e., the text logs 230) can require cleanup 240 such as the removal of unnecessary characters like special chars (%.()). Additionally, the cleanup 240 can include the removal of frequently used words (a, an, the . . . ) that do not convey any special meanings (and thus are not useful for clustering purposes given the noise they generate). Given the variety in the textual descriptions of each request, the cleaned-up log information can have different lengths. TF-IDF can be used to extract top 20 keywords for logged request. In addition, if the cleaned-up text is too short, empty <NA> word can be filed.

Next, at 250, a word embedding/natural language processing algorithm such as word2vec can convert each word to be a vector of specific size (e.g., 10 values). The resulting vectors are then averaged to result in a single vector for the request having that same specific size (e.g., 10 values). For example, average ([1, 3, 4]+[5, 6, 7])=[(1+5)/2, (3+6)/2, (4+7)/2 ]. Stated differently, each word will generate one vector, for example [1, 3, 4] . The average of all vectors can then be calculated from the words from a request. Here average([1, 3, 4]+[5, 6, 7])=[(1+5)/2, (3+6)/2, (4+7)/2] means calculating the average of all vectors of one request, and one vector represents one word.

While this processing may not contain all of the original log text information, the resulting vector provides sufficient information for clustering purposes.

Thereafter, at 260, the numeric vector and the text vector (after the word2vec processing and averaging), can be combined to result in a combined vector to represent the corresponding request. The combining can be accomplished, for example, by concatenating the numeric vector and the text vectors. As vector values can vary a lot from, for example, 1 to 100, the values can be normalized from each dimension.

Thereafter, a clustering algorithm 270 can be applied such as K-Means clustering to each type of request (e.g., logon, open, view, etc.). For example, for all logon requests, K-Means clustering can be performed to categorize the requests as being a normal request 280 (i.e., requests within a boundary defined by a cluster) and an abnormal request 290 (requests falling outside a defined cluster and/or the boundary defined by the normal request cluster, etc.). Furthermore, if needed, information characterizing or otherwise encapsulating the abnormal requests 290 can be sent to engineering/operations teams for further analysis.

Referring again to cleaning operation 240, the original log records can be messy. The text can be scanned to replace the useless special chars (/( )%&#) with spaces and multiple consecutive spaces can be merged as one space as separator. For common words like a/the/be/and, such words cannot represent the real meaning of the sentence and so such words can also be replaced with a space. Further, different log text may contain different number of words, some are long, some are short, and, to provide consistent and accurate clustering, the top keywords needs to be determined and capped at a pre-defined threshold (e.g., 20 words, etc.).

The top keywords can be captured using various algorithms including the TF-IDF (term frequency-inverse document frequency) algorithm. TF-IDF is a numerical statistic that is intended to reflect how important a word is to a document (in this case log entry text) in a collection or corpus.

TF: Term Frequency, which measures how frequently a term occurs in a document (in this case log entry text). As every log entry text is different in length, it is possible that a term would appear much more times in longer log entry texts than shorter ones. Thus, the term frequency can be divided by the length of the log entry text (also referred to as the total number of terms in the log entry text) as a way of normalization:

$$tf_{i,j} = \frac{n_{i,j}}{\sum_k n_{k,j}}$$

The numerator represents the occurrence count of the word in the log entry text, the denominator represents the sum of all words' occurrence in all texts.

IDF: Inverse Document Frequency, which measures how important a term is for a document. While computing TF, all terms are considered equally important. However, it is known that certain terms, such as "is", "of", and "that", may appear a lot of times but have little importance. Thus there is a need to weigh down the frequent terms while scale up the rare ones, by computing the following:

$$idf_i = lg\frac{|D|}{|\{j:t_i \in d_j\}|}$$

D: Total number of texts $|\{j:t_i \in d_j\}|$: number of texts where the word appears. If the word is didn't appear, this will lead to a division-by-zero. It is therefore common to adjust the denominator to be:

$1+|\{j:t_i \in d_j\}|$

Then TF-IDF is calculated as $tfidf_{i,j} = tf_{i,j} \times idf_i$

Then for the text, TF-IDF can be used to calculate the top 20 keywords by ranking the TF-IDF score of each word, get the top 20 scores. If less than 20, <NA> padding words can be used to fill in.

Figure 3:
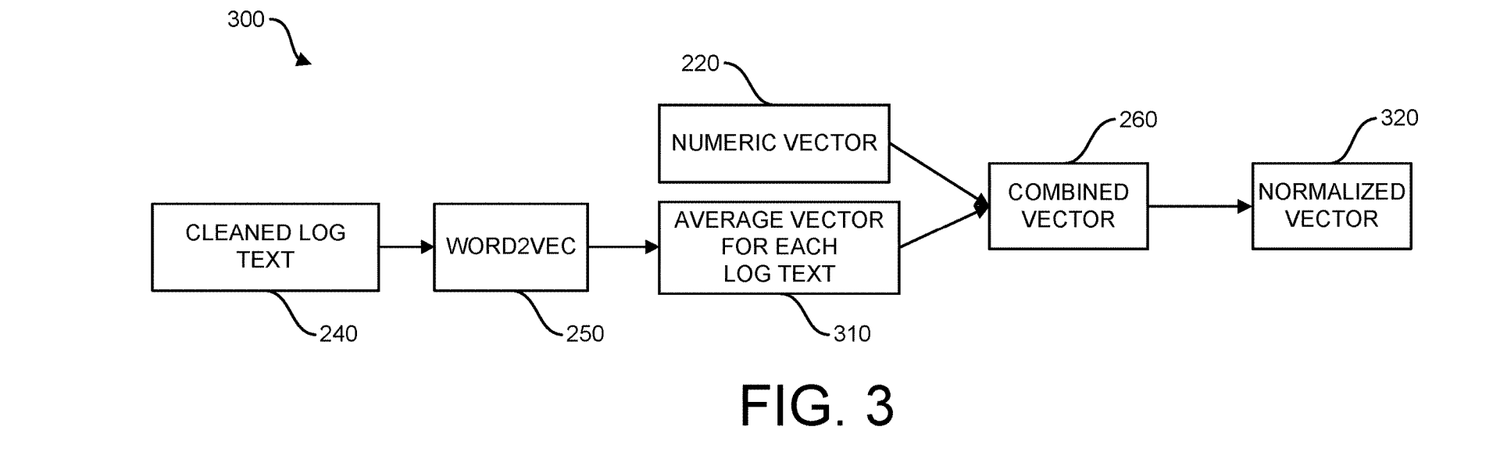
FIG. 3 is a first diagram illustrating aspects relating to the generation of a normalized combined vector.

With reference to diagram 300 of FIG. 3 and as mentioned above, each request can be converted into a vector. With the cleaned log text 240, word2vec 250 can be called to convert each word to be a vector (here it is a 10-dimensional vector). But for the log contents, there can be many vectors, and as such, an average vector 310 can be calculated from all the vectors. Therefore, there is only one word vector for that request as representative.

Figure 4:
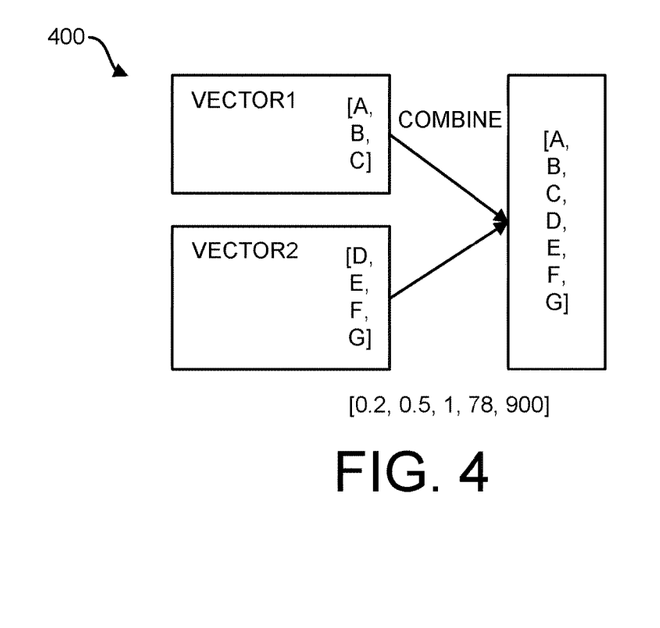
FIG. 4 is a second diagram illustrating aspects relating to the generation of a combined vector.

The original numeric vector can then be combined with the average word vector. With reference to diagram 400 of FIG. 4, to make the scale unified, the combined vector can be normalized. For example, as show in FIG. 4, vector x=[0.2, 0.5, 1, 78, 900] can be normalized by calculating x=(x-mean([0.2, 0.5, 1, 78, 900]))/stddev([0.2, 0.5, 1, 78, 900]). Here x is a vector, so values can be calculated for each dimension of this vector resulting in a new vector with the same dimension. Normalizing in this context can include, calculating the mean value of the vector as well as its standard deviations. The mean value can then be subtracted and divided by its standard deviation. The formula is:

$x=(x-\text{mean}(x))/\text{stddev}(x)$

Specially in this case, there is a need to normalize a uniform vector for example, reqTime(request time) for different requests, CPU time for different requests, and the like. Therefore, a matrix can be constructed with all of the vectors, then transposed, and all vectors having the same logic can be extracted and normalized.

Pseudocode to implement the normalizing can be as follows:

```
public static Dataset<Row> word2Vec(Dataset<Row>
wordsDataset, String savePath) throws Exception {
    //From words to Vectors.
    Word2Vec word2Vec = new Word2Vec( ).setInputCol("text")
        .setOutputCol("result").setVectorSize(10).setMinCount(0);
    Word2VecModel model = word2Vec.fit(wordsDataset);
    Dataset<Row> result = model.transform(wordsDataset);
        return result;
}
public static Dataset<Row> normalizeRow(Dataset<Row>
dataset, String column) {
    Row row = dataset.select(mean(dataset.col(column)),
stddev(dataset.col(column))).first( );
    dataset = dataset.withColumn(column, expr("(" + column +
"- " + row.getDouble(0) + ")/" + row.getDouble(1) + ""));
        return dataset;
}
public static Vector combineTwoVectors(double [ ] numbers,
Vector vec) {
    double[ ] vecArray = vec.toArray( );
    double[ ] oneArray = ArrayUtils.addAll(numbers,
vecArray);
    DenseVector denseVec = new DenseVector(oneArray);
        return denseVec;
}
```

Figure 5:
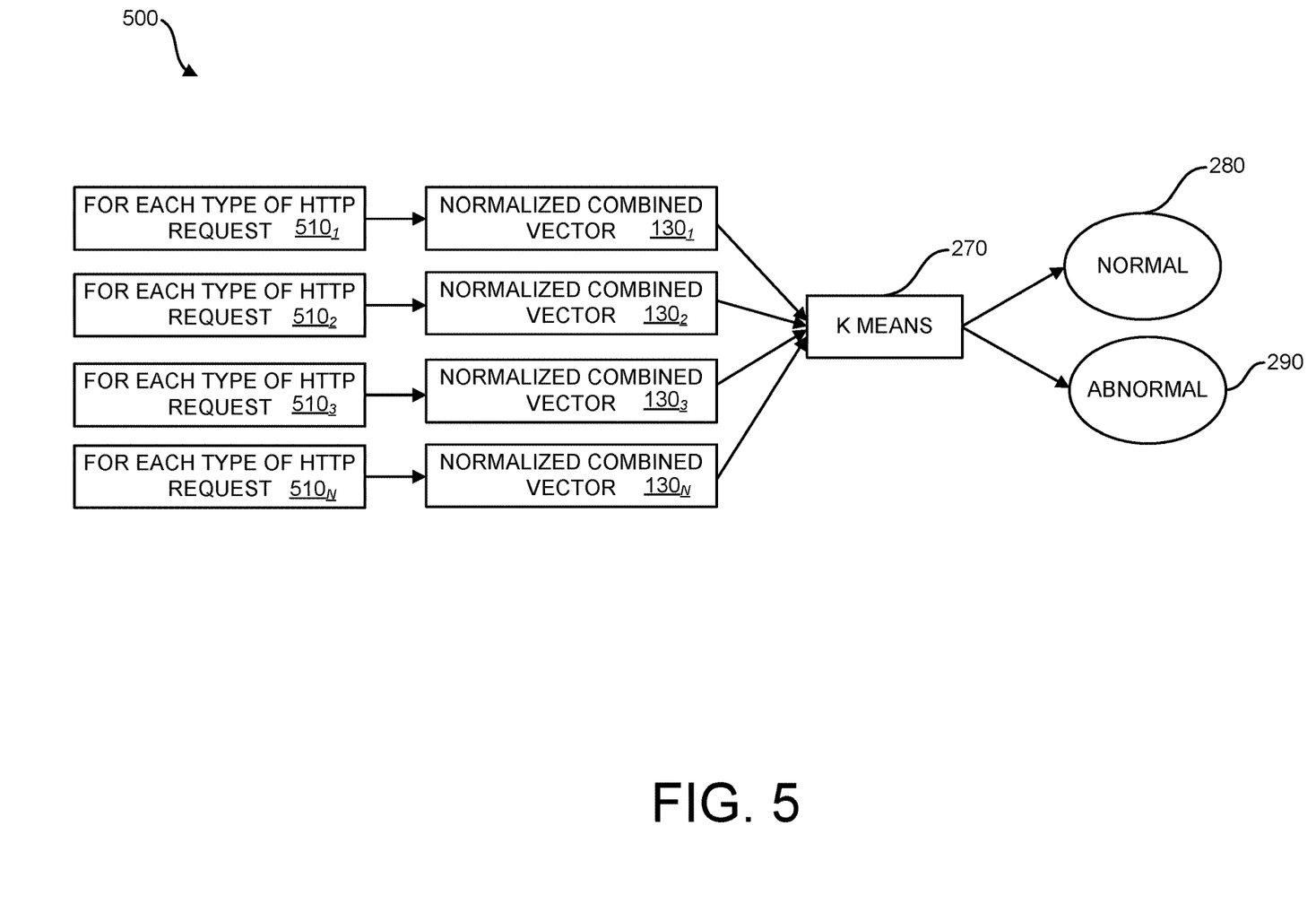
FIG. 5 is a second diagram illustrating aspects relating to the generation of a normal request cluster and an abnormal request cluster.

With reference to diagram 500 of FIG. 5, each type of request $510_{1...N}$ needs to be categorized. For example, for a login request, it needs to be determined whether such a request is normal 280 or abnormal 290. For login requests, there are numerous requests from different users and each request is a normalized combined vector $320_{1...n}$. k-means clustering 270 can be run on these normalized combined vectors $320_{1...n}$ for unsupervised learning.

k-means clustering 270 is based on vector distance calculation. For two vectors X,Y, the distance can be calculated as follows:

$$dist(X, Y) = \sqrt{\sum_{i=1}^{n} (x_i - y_i)^2}$$

With k-means clustering 270, all of the normalized combined vectors $320_{1...n}$ can be combined as two groups (normal 280 or abnormal 290), each group member should have the shortest distance to the center of its respective group. If not, the average can be calculated as the new center and the vector can re-join one of the groups based on new calculated distance. In some scenarios, there can be baseline request logs which contains a large number of normal requests and a small number of abnormal/anomalous requests. Using these baseline request logs, new requests can be categorized as being normal 280 or abnormal 290 based on their distance to the respective centers of such clusters/groups. If no baseline defined, one approach is that with two categories, the category that has more requests is the normal behavior, abnormal behavior always contains less requests (thus making them anomalous).

Thereafter, for specific types of requests $510_{1...N}$ (e.g., logon, open, view, etc.) k-means 270 can be run to cluster each type of requests. For example, for all logon requests $510_{1...N}$, k-Means clustering 270 can be run on the associated normalized combined vectors $320_{1...n}$ so they can be categorized as normal 280 or abnormal requests 290. Furthermore, if needed, abnormal requests 290 can be sent to engineering/operations teams for further analysis.

Pseudocode for generating the normal and abnormal request clusters 280, 290 can be as follows:

```
VectorAssembler assembler = new
VectorAssembler( ).setInputCols(inputCols).setOutputCol("feature-
Vector").setHandle Invalid("skip");
    KMeans kmeans = new
KMeans( ).setK(2).setMaxIter(50).setFeaturesCol("feature-
Vector").setPredictionCol("prediction");
    Pipeline pipeline = new Pipeline( ).setStages(new PipelineStage[ ]
{ assembler, kmeans });
    PipelineModel pipelineModel = pipeline.fit(trainingData);
    Transformer[ ] allTransformers = pipelineModel.stages( );
    Transformer lastTransformer =
allTransformers[allTransformers.length - 1];
    KMeansModel kmeansModel = (KMeansModel) lastTransformer;
    Dataset<Row> transformedData = assembler.transform(trainingData);
    Dataset<Row> transDataset = pipelineModel.transform(trainingData).
```

Once the normal request cluster 280 and abnormal request cluster 290 have been specified, subsequent requests received by the cloud computing environment can be handled in a similar manner with regard to the vectorization described above and as illustrated in FIGS. 1-5 which, in turn, is used in connection with generating the clusters 280, 290. In other words, text within new requests (i.e., requests received after the clusters 280, 290 are generated) can be combined with performance metrics associated with the execution of such requests by the cloud computing environment in a vector. Distance measurements relative to the clusters 280, 290 can then be used to assign or otherwise classify the vector as being normal (it is closer to the normal request cluster 280) or abnormal (it is closer to the abnormal request cluster 290).

Figure 6:
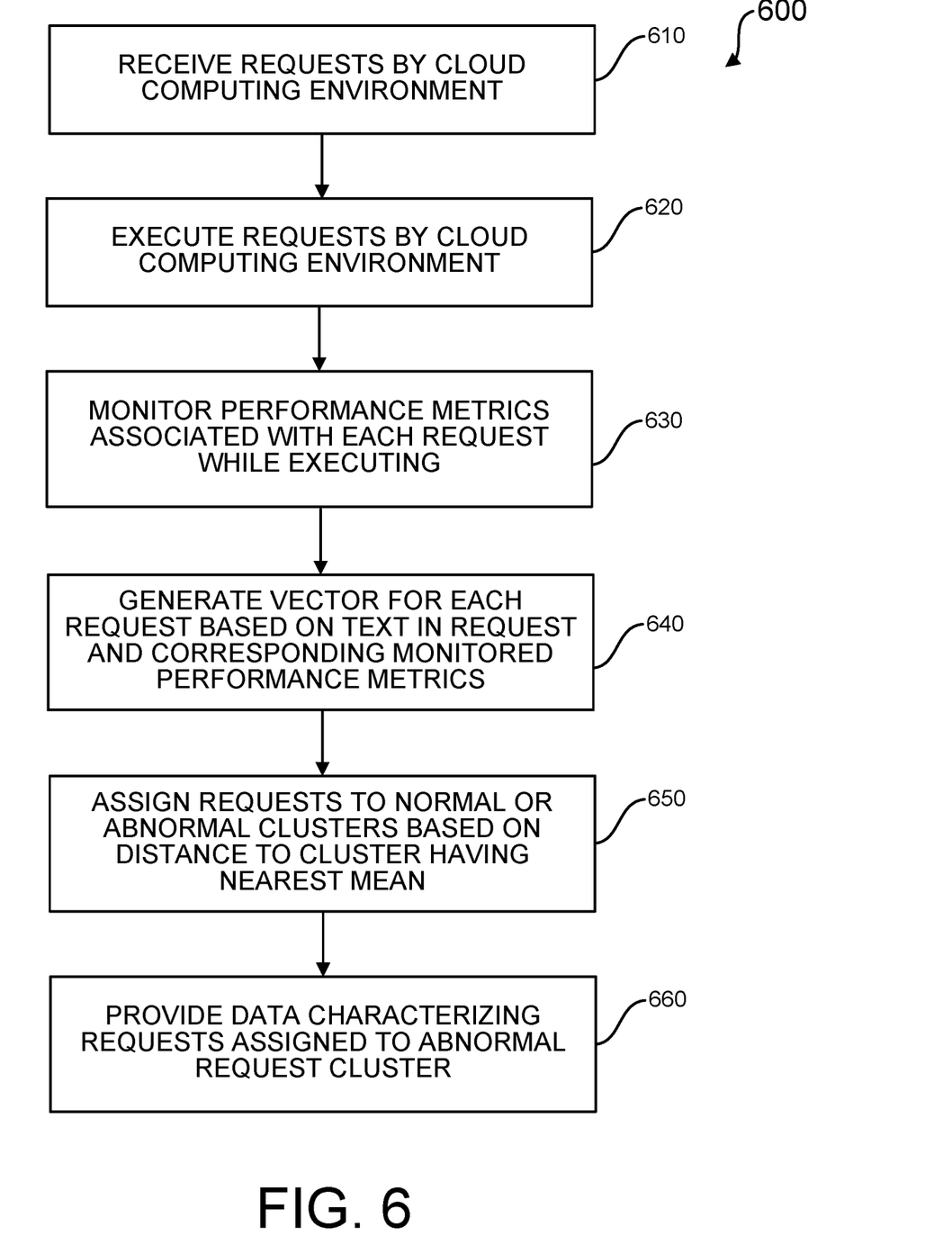
FIG. 6 is a process flow diagram illustrating detection of anomalous requests received by a cloud computing environment.

FIG. 6 is a process flow diagram 600 in which, at 610, requests are received for handling by a cloud computing environment which each encapsulate text. Thereafter, at 620, each of the requests is executed by the cloud computing environment. While each request is executing, at 630, performance metrics associated with the request are monitored. A vector is subsequently generated, at 640, that encapsulates information associated with the request including the text within the request and the corresponding monitored performance metrics. Each request is then assigned (after it has been executed), at 650, to either a normal request cluster or an abnormal request cluster based on which cluster has a nearest mean relative to the corresponding vector. In addition, at 660, data can be provided that characterizes requests assigned to the abnormal request cluster. Providing, in this regard, can include causing the data characterizing the abnormal requests to be displayed in an electronic visual display, stored in physical persistence, loaded into memory and/or transmitted to a remote computing device.

This provided data can convey information regarding the requests so that a code patch or other measures can be implemented in the cloud computing environment to ensure that such requests are handled properly when subsequently received (which can also cause such requests to be assigned to the normal request cluster). The current subject matter can be utilized in a testing environment prior to deploying a system in a production environment. Such an arrangement can be technically advantageous in that code patches can be applied to the system to prevent issues relating to abnormal requests. For example, abnormal requests can consume significant server/cluster resources thus increasing the amount of time needed to handle normal requests. In some cases, abnormal requests can result in server/cluster failure.

In some variations, the provided data can be a report. For example, a report can specify various attributes regarding text/words and/or numeric values typically respectively found within normal/abnormal requests. Combining the text/words from the log entry text with the numeric values can allow for easier and more precise identification of abnormal request.

Figure 7:
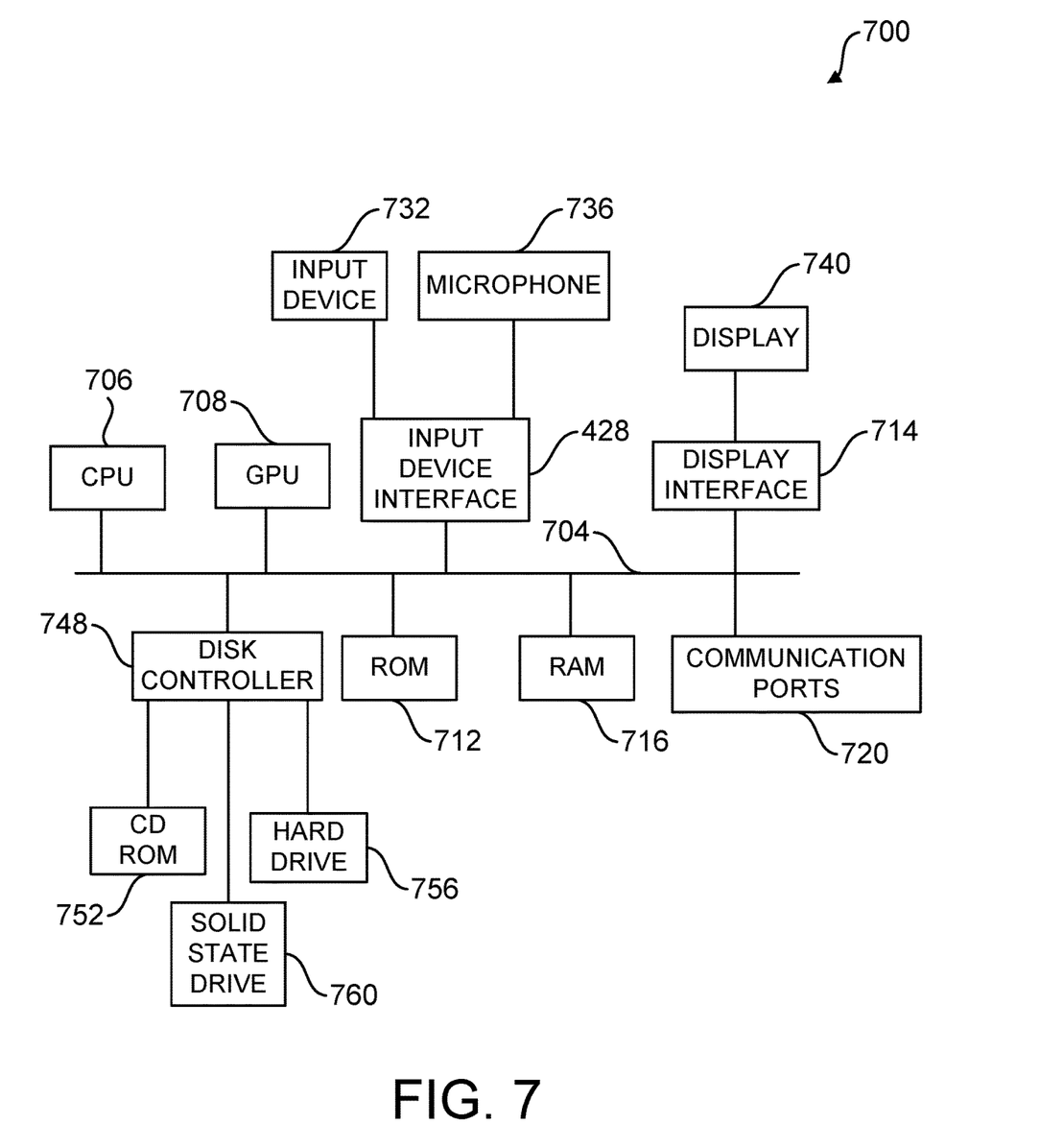
FIG. 7 is a diagram of a computing device for implementing aspects of the current subject matter.

FIG. 7 is a diagram 700 illustrating a sample computing device architecture for implementing various aspects described herein including aspects of one or more servers forming part of the cloud computing environment and/or client computing devices for interacting with such cloud computing environment. A bus 704 can serve as the information highway interconnecting the other illustrated components of the hardware. A processing system 706 labeled CPU (central processing unit) (e.g., one or more computer processors/data processors at a given computer or at multiple computers) and/or a processing system 708 labeled GPU (graphical processing unit) can perform calculations and logic operations required to execute a program. A non-transitory processor-readable storage medium, such as read only memory (ROM) 712 and random access memory (RAM) 716, can be in communication with the processing systems 706, 708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface with one or more optional disk drives to the system bus 704. These disk drives can be external or internal solid state drives such as 760, external or internal CD-ROM, CD-R, CD-RW or DVD, or external or internal hard drives 756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the at least one communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 via a display interface 714 to the user and an input device 732 such as keyboard and/or a pointing device (e.g., a mouse or a trackball) and/or a touchscreen by which the user can provide input to the computer. Other kinds of input devices 732 can be used to provide for interaction with a user as well; for example, feedback provided to the user can be any form of sensory feedback (e.g., visual feedback, auditory feedback by way of a microphone 736, or tactile feedback); and input from the user can be received in any form, including acoustic, speech, or tactile input. The input device 732 and the microphone 736 can be coupled to and convey information via the bus 704 by way of an input device interface 728. Other computing devices, such as dedicated servers, can omit one or more of the display 740 and display interface 714, the input device 732, the microphone 736, and input device interface 728.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more computing devices comprising:
    receiving, by a cloud computing environment, a plurality of requests for handling by the cloud computing environment, each of the requests encapsulating text;
    executing each of the requests by the cloud computing environment;
    monitoring performance metrics associated with the execution of each request;
    generating, for each request, a first vector based on the text encapsulated within the request;
    generating, for each request, a second vector based on the monitored performance metrics corresponding to the request;
    generating, for each request, a third vector by combining the first and second vectors;
    assigning each request to either a normal request cluster or an abnormal request cluster based on which cluster has a nearest mean relative to the corresponding third vector; and
    providing data characterizing the requests assigned to the abnormal request cluster.

2. The method of claim 1 further comprising:
    generating the normal request cluster and the abnormal request cluster using k-means clustering.

3. The method of claim 2, wherein the nearest mean corresponds to a cluster having a least squared Euclidian distance.

4. The method of claim 3, wherein the normal request cluster and the abnormal request cluster are generated based on logged historical requests received by the cloud computing environment.

5. The method of claim 4, wherein the requests are of different types and, for each request type, there is a corresponding normal request cluster and a corresponding abnormal request cluster.

6. The method of claim 3, wherein the k-means clustering defines the normal request cluster and the abnormal request cluster using combined vectors encapsulating information derived from logged historical requests with numeric performance metrics associated with the corresponding request.

7. The method of claim 6 further comprising: converting text from logged historical requests into numeric values using a word embedding algorithm.

8. The method of claim 7, wherein the word embedding algorithm is word2vec.

9. The method of claim 8 further comprising:
    selectively removing text within each logged historical request prior to generating the corresponding combined vector to optimize the k-means clustering.

10. The method of claim 8 further comprising:
    normalizing each combined vector prior to generating the normal request cluster and the abnormal request cluster using k-means clustering.

11. The method of claim 8 further comprising: averaging multiple vectors for each historical request to generate an average vector, the average vector being combined with a numeric vector to result in the combined vector for each request.

12. The method of 4, wherein the logged historical requests each identify a type of request, an amount of time to handle the request, an amount of time to handle a query associated with the request, processing resources used by the request, or memory used by the request.

13. The method of claim 1, wherein the requests originate from a client computing device and are associated with execution of a cloud-based software application in a browser executing on the client computing device.

14. The method of claim 1 further comprising:
    transmitting data to a remote computing system characterizing each request assigned to the abnormal request cluster.

15. The method of claim 1, wherein the requests are hypertext transfer protocol (HTTP) requests.

16. The method of claim 1 further comprising:
    executing or attempting to execute, by the cloud computing environment, requests assigned to the abnormal request cluster.

17. The method of claim 1, wherein the providing data comprises: causing the data characterizing requests assigned to the abnormal request cluster to be displayed in an electronic visual display, storing the data characterizing requests assigned to the abnormal request cluster in physical persistence, or loading the data characterizing requests assigned to the abnormal request cluster in memory.

18. The method of claim 1 further comprising:
    implementing at least one code patch in the cloud computing environment which causes a request previously assigned to the abnormal request cluster to be subsequently assigned to the normal request cluster when received again by the cloud computing environment.

19. A system comprising:
    at least one data processor; and
    memory storing instructions which, when executed by the at least one data processor, result in operations comprising:
        receiving, by a cloud computing environment, a plurality of requests for handling by the cloud computing environment, each of the requests encapsulating text;
        executing each of the requests by the cloud computing environment;
        monitoring performance metrics associated with the execution of each request;
        generating, for each request, a first vector based on the text encapsulated within the request;
        generating, for each request, a second vector based on the monitored performance metrics corresponding to the request;
        generating, for each request, a third vector by combining the first and second vectors;
        assigning each request to either a normal request cluster or an abnormal request cluster based on which cluster has a nearest mean relative to the corresponding third vector; and
        providing data characterizing the requests assigned to the abnormal request cluster.

20. A method for implementation by one or more computing devices comprising:
- receiving, by a cloud computing environment, a plurality of requests for handling by the cloud computing environment, each of the requests encapsulating text;
- executing each of the requests by the cloud computing environment;
- logging monitoring performance metrics associated with the execution of each request in a log;
- generating, for each request in the log, a first vector based on the text encapsulated within the request;
- generating, for each request in the log, a second vector based on the monitored performance metrics corresponding to the request;
- generating, for each request in the log, a third vector by combining the first and second vectors; and
- generating, using k-means clustering as applied to the generated third vectors, a normal request cluster specifying a boundary for the third vectors and an abnormal request cluster corresponding to third vectors falling outside the specified boundary of the normal request cluster.

* * * * *